(12) United States Patent
Miyake

(10) Patent No.: US 6,400,413 B1
(45) Date of Patent: Jun. 4, 2002

(54) IMAGE PROCESS APPARATUS, IMAGE PROCESS METHOD AND COMPUTER-READABLE STORAGE MEDIUM

(75) Inventor: Nobutaka Miyake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/217,131

(22) Filed: Dec. 21, 1998

(30) Foreign Application Priority Data

Dec. 26, 1997 (JP) .............................. 9-360706

(51) Int. Cl.[7] .............................. H04N 1/393
(52) U.S. Cl. .................. 348/581; 348/458; 348/561; 348/704; 348/441; 382/299; 382/298
(58) Field of Search .................. 348/458, 581, 348/439.1, 561, 625, 556, 252, 445, 913, 441, 440.1, 704; 382/298, 264, 299, 266, 300, 269; 358/1.2; 345/127, 130, 439; H04N 1/393

(56) References Cited

U.S. PATENT DOCUMENTS

| | | | | |
|---|---|---|---|---|
| 4,953,114 A | * | 8/1990 | Sato | 382/237 |
| 5,280,546 A | * | 1/1994 | Machida et al. | 382/47 |
| 5,739,867 A | * | 4/1998 | Eglit | 348/581 |
| 5,760,921 A | | 6/1998 | Miyake | 358/458 |
| 5,875,268 A | | 2/1999 | Miyake | 382/276 |
| 5,911,007 A | | 6/1999 | Miyake | 382/233 |
| 5,917,963 A | | 6/1999 | Miyake | 382/300 |
| 6,002,810 A | * | 12/1999 | Wakisawa et al. | 382/298 |
| 6,088,489 A | * | 7/2000 | Miyake | 382/299 |
| 6,130,966 A | * | 10/2000 | Sekine et al. | 382/299 |
| 6,141,061 A | * | 10/2000 | Takeuchi | 348/581 |
| 6,157,749 A | * | 12/2000 | Miyake | 382/300 |

FOREIGN PATENT DOCUMENTS

| | | |
|---|---|---|
| JP | 7093531 | 4/1995 |
| JP | 7105359 | 4/1995 |
| JP | 7107268 | 4/1995 |
| JP | 9252400 | 9/1997 |

* cited by examiner

Primary Examiner—John W. Miller
Assistant Examiner—Jean W. Désir
(74) Attorney, Agent, or Firm—Fitzpatrick, Cella, Harper & Scinto

(57) ABSTRACT

Input image information from an input terminal is stored in a line buffer for several lines and smoothed, and then an interpolation value for plural pixels is obtained by an interpolation unit. Further, maximum and minimum values are detected from information of a noticeable pixel and its peripheral pixels. An arithmetic unit performs calculation by using these detected values (interpolation value, maximum value and minimum value) and a predetermined value to obtain a high-resolution output value h(k). By this calculation, a jagless clear high-resolution image can be obtained even in a case where a contrast of inputted low-resolution information is deteriorated.

14 Claims, 12 Drawing Sheets

$J = MIN(|A-E|, |B-E|, |C-E|, |D-E|) = |X-E|$ $\begin{pmatrix} J : \text{SHORTEST DISTANCE BETWEEN INTERPOLATION} \\ \text{POINT AND OBSERVATION POINT} \\ X : \text{OBSERVATION POINT OF SHORTEST DISTANCE} \end{pmatrix}$

INTERPOLATION POINT $E = X$

INTERPOLATION POINT E
$= (1-i)(1-j)A + i \cdot (1-j)B + j \cdot (1-i)C + ijD$

FIG. 14
```
200  10  10  10
 10 200  10  10
 10  10 200  10    ......
 10  10  10 200
         ⋮
```
INPUT INFORMATION

FIG. 15
```
200 200  10  10  10  10  10  10
200 200  10  10  10  10  10  10
 10  10 200 200  10  10  10  10
 10  10 200 200  10  10  10  10
 10  10  10  10 200 200  10  10    ......
 10  10  10  10 200 200  10  10
 10  10  10  10  10  10 200 200
 10  10  10  10  10  10 200 200
                ⋮
```
INFORMATION OBTAINED AFTER RESOLUTION CONVERSION BY CLOSEST INTERPOLATION METHOD
<DOUBLE×DOUBLE>

FIG. 16
```
200 105  10  10  10  10  10  10
105 105 105  58  10  10  10  10
 10 105 200 105  10  10  10  10
 10  58 105 105 105  58  10  10
 10  10  10 105 200 105  10  10    ......
 10  10  10  58 105 105 105  58
 10  10  10  10  10 105 200 105
 10  10  10  10  10  58 105 105
                ⋮
```
INFORMATION OBTAINED AFTER RESOLUTION CONVERSION BY COMMON PRIMARY INTERPOLATION METHOD
<DOUBLE×DOUBLE>

IMAGE PROCESS APPARATUS, IMAGE PROCESS METHOD AND COMPUTER-READABLE STORAGE MEDIUM

BACKGROUND OF THE INVENTION

1. Field of the Invention

The present invention relates to an image process apparatus, an image process method and a computer-readable storage medium used therein. The apparatus and method are preferably used in an image output apparatus such as a printer or the like for zooming and outputting input image information, or used in a case where low-resolution information is converted into high-resolution information in communication among plural equipments of which resolutions are different from others.

2. Related Background Art

Conventionally, various methods have been proposed as a method to convert inputted low-resolution information into high-resolution information. In such the conventional method, a conversion process method is different according to a kind of target image (e.g., multivalue image having gradation information for each pixel, binary image binarized by pseudo halftoning, binary image binarized based on fixed threshold, character image, or the like).

As a conventional interpolation method, a closest interpolation method shown in FIG. 12 to arrange a pixel value closest to an interpolation point, a common primary interpolation method shown in FIG. 13 to determine a pixel value E by a following calculation according to distances among four points (of which pixel values are assumed to be A, B, C and D respectively) surrounding an interpolation point and the interpolation point, or the like are generally used.

$$E=(1-i)(1-j)A+i \cdot (1-j)B+j \cdot (1-i)C+ijD$$

(in case of distance between pixels="1", distance "i" in lateral direction and distance "j" in longitudinal direction from "A" ($i \leq 1, j \leq 1$)).

However, such a conventional art has following drawbacks.

Firstly, although the method in FIG. 12 has an advantage in a simple structure, in a case where a target image is used in a natural image or the like, since the pixel value is determined every block to be enlarged, the block is visually emphasized, thereby deteriorating image quality.

Secondly, even in a case where the method is used in a character image, linear image, a CG (computer graphic) or the like, since the same pixel values are sequentially continued every block to be enlarged, an indention phenomenon called as a jaggy phenomenon (or jag) is emphasized especially in an oblique line or the like, thereby deteriorating image quality. FIGS. 14 and 15 show states that the jag appears. FIG. 14 shows an example of input information, and FIG. 15 shows an example of resolution conversion in which the input information of which pixel number are double laterally and longitudinally by the method of FIG. 12. Generally, as a magnification becomes higher, image deterioration becomes serious ("200" and "10" in FIGS. 14 and 15 are pixels values).

On the other hand, the method shown in FIG. 13 is generally used in enlarging the natural image. In this method, the pixel values are averaged to obtain a smoothing image. However, an edge portion or a portion to which sharp image quality is necessary comes to be blurred. Further, in case of an image obtained by scanning a map or the like or a natural image containing a character portion, there is some fear that a reception side can not receive important information because of a blur caused by the interpolation.

FIG. 16 shows image information which is obtained by an interpolation process to double the input image information of FIG. 14 laterally and longitudinally in the method of FIG. 13.

As apparent from FIG. 16, the pixel values do not become uniform not only at a peripheral portion of an oblique line but also at the oblique line itself, whereby a blur appears.

Therefore, in U.S. patent application Ser. No. 311,560 filed on Sep. 23, 1994 (based on Japanese Patent Application Laid-Open Nos. 7-93531, 7-107268 and 7-105359), the applicant of this application proposed such a method as enabling to perform the resolution conversion without generating the blur caused by the interpolation process and generating the jag in forming the high-resolution information from the low-resolution information.

A basic concept of this proposal is based on a method in which components depending on the resolution are eliminated from inputted original information, the number of pixels is increased up to the number corresponding to the output resolution in such a state that the components have been eliminated, and information suitable for a new resolution is speculated and formed in such a state as the number of pixels has been increased. As a means for eliminating dependency of the input resolution, smoothing by an LPF (low-pass filter) and increasing of the pixel number can be realized by a linear interpolation. In a speculation of the high-resolution information, the pixel value to be outputted is calculated by executing different processes to the pixels classified as "1" and the pixels classified as "0" upon simply binarizing the interpolated information.

As proposed in U.S. patent application Ser. No. 715,116 filed on Sep. 23, 1994 (based on Japanese Patent Application Laid-Open No. 9-252400), there is a method for forming a satisfactory edge in which continuity of the pixel values is maintained. In U.S. patent application Ser. No. 715,116, m ($m \geq 1$) pixels (pixel value at observation point n in m pixels is defined as P(n)) are detected from peripheral pixels of a low-resolution noticeable pixel, and an output value h(k) is calculated based on an interpolation value C(k) at each interpolation point k obtained by interpolating the noticeable pixel for plural pixels, according to a following equation.

$$h(k) = \sum_{n=1}^{m} \alpha(n)P(n) + \beta C(k)$$

($\alpha(n)$ and $\beta(\beta \neq 0)$ are arbitrary coefficients)

However, in any of these relative applications, a basic concept is to form the edge by using maximum and minimum values within a widow on the periphery of the noticeable pixel. That is, these applications apply a method that, in a case where one noticeable pixel is enlarged N times longitudinally and M times laterally, an area within the N×M pixels is assumed to be a part of the edge formation by the maximum and minimum values, and the pixel values of the N×M pixels are newly calculated. According to this method, surely the original image can be converted without unnaturalness as if the high-resolution information is inputted.

However, if use of this method is expanded, there is a case where it is better to provide the image legible for a user even if impression of the original image is highly changed. For example, character information is cited as an example of this case. In a case where a printer is connected to a computer, there are a system in which the computer side having a vector-form font converts resolution into printer resolution, and a system wherein the print side having a font expands it based on code information sent from the computer side and outputs the data. In this case, since the character information has the vector form, any substantial problem does not occur even if the resolution of input and output sides are different from each other.

However, if it is assumed that the printer is connected to an equipment other than the computer, e.g., an internet television or the like, there is a case where a screen font which is displayed on a television screen and has been anti-alias processed is transmitted to the printer as it is. Further, if it is assumed that the printer is connected to the computer, there are a case where it is necessary to perform screen copy to duplicate information on the screen and a case where it is necessary to tidy and clearly output a character added to the image as a part thereof.

Such a situation is similarly applied to a facsimile apparatus which mainly treats characters and drawings. This is because, in such apparatuses, contrast is reduced and a degree of sharpness in the edge portion becomes dull according to an MTF (modulation transfer function) of an image pickup system for image reading. In these cases, it is unnecessary to generate high-resolution information by reducing the jag and interpolation blur without changing an impression of the inputted low-resolution information, but is necessary to actively convert the inputted low-resolution information into the legible image even if the impression of the low-resolution information is slightly changed. This operation depends on a fact that a property of the character information intended to be transmitted by the user is different from that of the natural image information or the like. That is, in the above equation, although the pixel value of the interpolation point is obtained by a sum of products (i.e., calculation) of the interpolation value and the peripheral pixel value, such terms as contained in the sum of products are insufficient for the calculation. That is, if the contrast of the original image is deteriorated, a high-resolution image exceeding the contrast of the original image can not be formed.

SUMMARY OF THE INVENTION

The present invention has been made in consideration of the above-described conventional problems, and an object thereof is to provide an image process apparatus, an image process method and a computer-readable storage medium used therein. In the apparatus and method, a clear high-resolution image of which contrast is higher than that of input low-resolution information can be obtained without any jag even if the contrast of the input low-resolution information is deteriorated.

Another object of the present invention is to provide an image process apparatus, an image process method and a computer-readable storage medium used therein. In the apparatus and method, an edge angle and an edge central position can be freely designed in case of converting low-resolution information into high-resolution information, thereby enabling to form a satisfactory edge having continuity.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

FIG. 14 is a structural view showing an example of input information;

FIG. 15 is a structural view showing a processing example according to the method shown in FIG. 12; and FIG. 16 is a structural view showing a processing example according to the method shown in FIG. 13.

DETAILED DESCRIPTION OF THE PREFERRED EMBODIMENT

The preferred embodiment of the present invention will now be described in detail in accordance with the accompanying drawings.

Figures 1, 2:
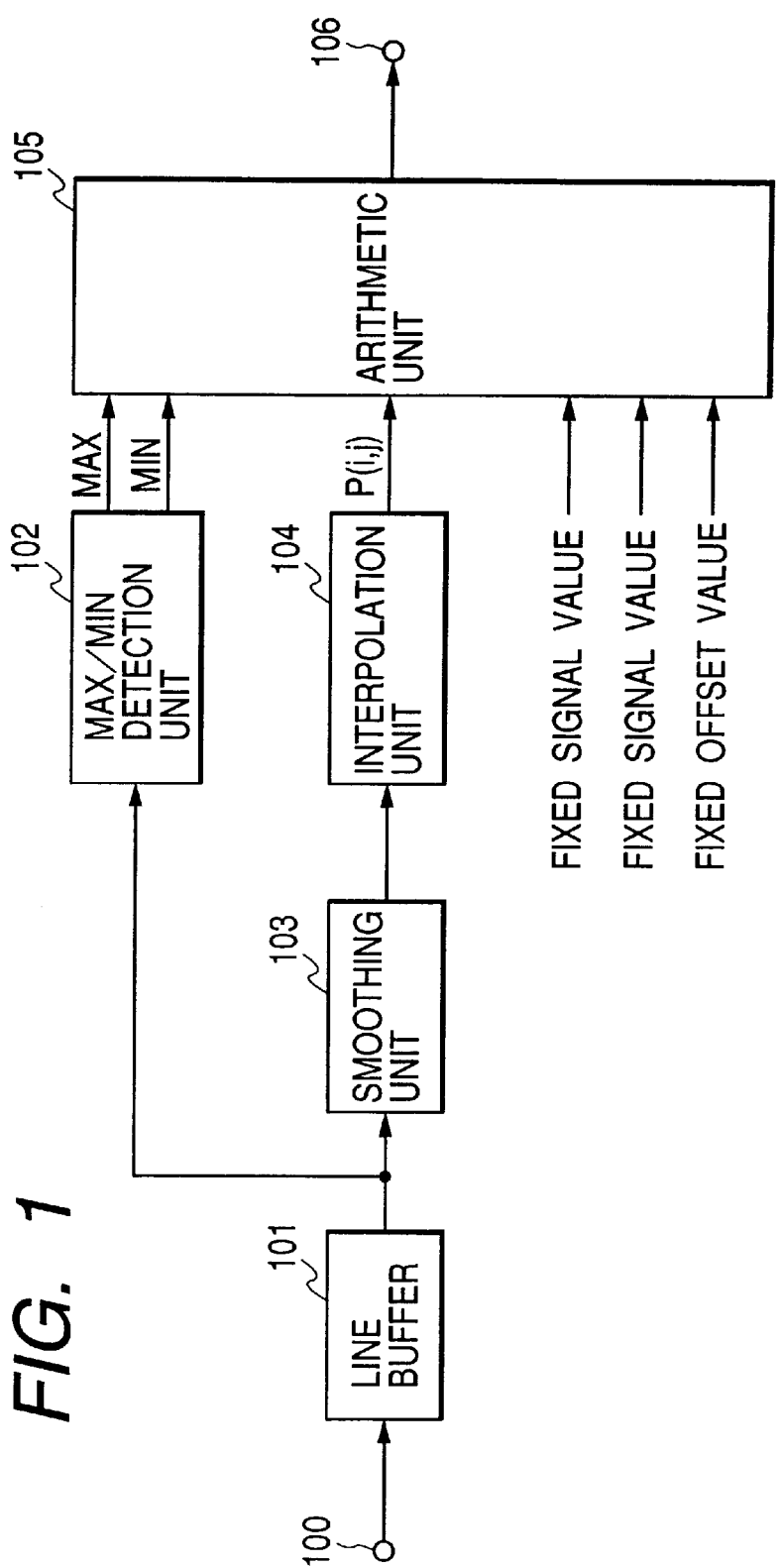
FIG. 1 is a block diagram showing an embodiment of the present invention.
FIG. 2 is a structural view showing an example of a smoothing filter.

FIG. 1 is a main block diagram showing the embodiment of the present invention. It is effective to provide an image process apparatus according to the present embodiment, within an image output apparatus such as a printer mainly connected to a computer, a printer connected to an equipment (e.g., internet television main body, set-top box of internet television or the like) other than the computer, and a video printer for inputting a video signal, or the like. However, the apparatus according to the present embodiment can be involved as an application software provided in an image process apparatus other than the image output apparatus, a facsimile apparatus or a host computer, or can be involved as a printer driver software to be used to output data to the printer.

Subsequently, structure and operation procedure in the present embodiment will be described with reference to the block diagram in FIG. 1. In the present embodiment, an example for converting inputted image information into information of which pixels number is enlarged N times longitudinally and M times laterally will be described.

In FIG. 1, numeral 100 denotes an input terminal to which low-resolution image information is inputted. The low-resolution information is stored and held for several lines by a line buffer 101. A process of window unit depending on plural peripheral pixels containing a noticeable pixel is executed based on the image information of several lines. Numeral 102 denotes a maximum/minimum value detection unit (to be referred as MAX/MIN detection unit hereinafter) which detects a maximum value and a minimum value from the image information within the window.

Numeral 103 denotes a smoothing unit which performs a filtering process to each of pixels within the window by using an LPF (low-pass filter). FIG. 2 shows an example of a smoothing filter. A high frequency component is interrupted by obtaining an average of nine pixels containing the noticeable pixel surrounded by other peripheral pixels.

In FIG. 1, numeral 104 denotes an interpolation unit. Pixels surrounded by original sampling points are filled around the noticeable pixel depending on a common primary interpolation process (to be referred as linear interpolation process hereinafter) such that the interpolation unit generates interpolation information at an interpolation point corresponded to longitudinal N pixels×lateral M pixels. Since the linear interpolation process is described in the conventional example shown in FIG. 12, description thereof will be omitted. As pixel values of the peripheral pixels used in a sum of products (i.e., calculation) of the linear interpolation, filtered pixel values are used. For example, in a case where the filter of 3×3 pixels shown in FIG. 2 is used, if a capacity of the line buffer 101 is provided for five lines, it becomes possible to perform the filtering process not only to the noticeable pixel but also to the peripheral eight pixels used in the sum of products.

Numeral 105 denotes an arithmetic unit. Two kinds of fixed signal values and an offset value in addition to three kinds of signal values such as the maximum value, the minimum value detected by the detection unit 102 and an interpolation value $P(i,j)$ ($0 \leq i < N$, $0 \leq j < M$) at the interpolation point $(i,j)$ calculated in the interpolation unit 104 are inputted to the unit 105. Then, the unit 105 calculates a new output value by performing a predetermined calculation based on the inputted six kinds of signal values. If the input signal is a digital signal consists of Z bits/pixel information for one color, an image signal can take $2^z$ values within a range from "0" to "$2^z-1$". In the present embodiment, the fixed input values to be inputted to the unit 105 are defined as the two kinds of values "0" and "$2^z-1$". In this case, the offset value may be a value previously and experimentally obtained.

The arithmetic unit 105 obtains the sum of products, and calculates an output value $D(i,j)$ at the interpolation point according to a following equation.

$$D(i,j) = a \times MAX + b \times MIN + c \times P(i,j) + d \times (2^z-1) + e \times 0 + \omega$$

(a, b, c, d and e are predetermined coefficients, and $\omega$ is arbitrary offset value)

The above output-point calculation is executed M×N times, generation of high-resolution information for one noticeable pixel, and then the calculated result is outputted to an output terminal 106.

In the above structure, the high-resolution information is generated from the low-resolution information according to the following procedure.

Figure 3:
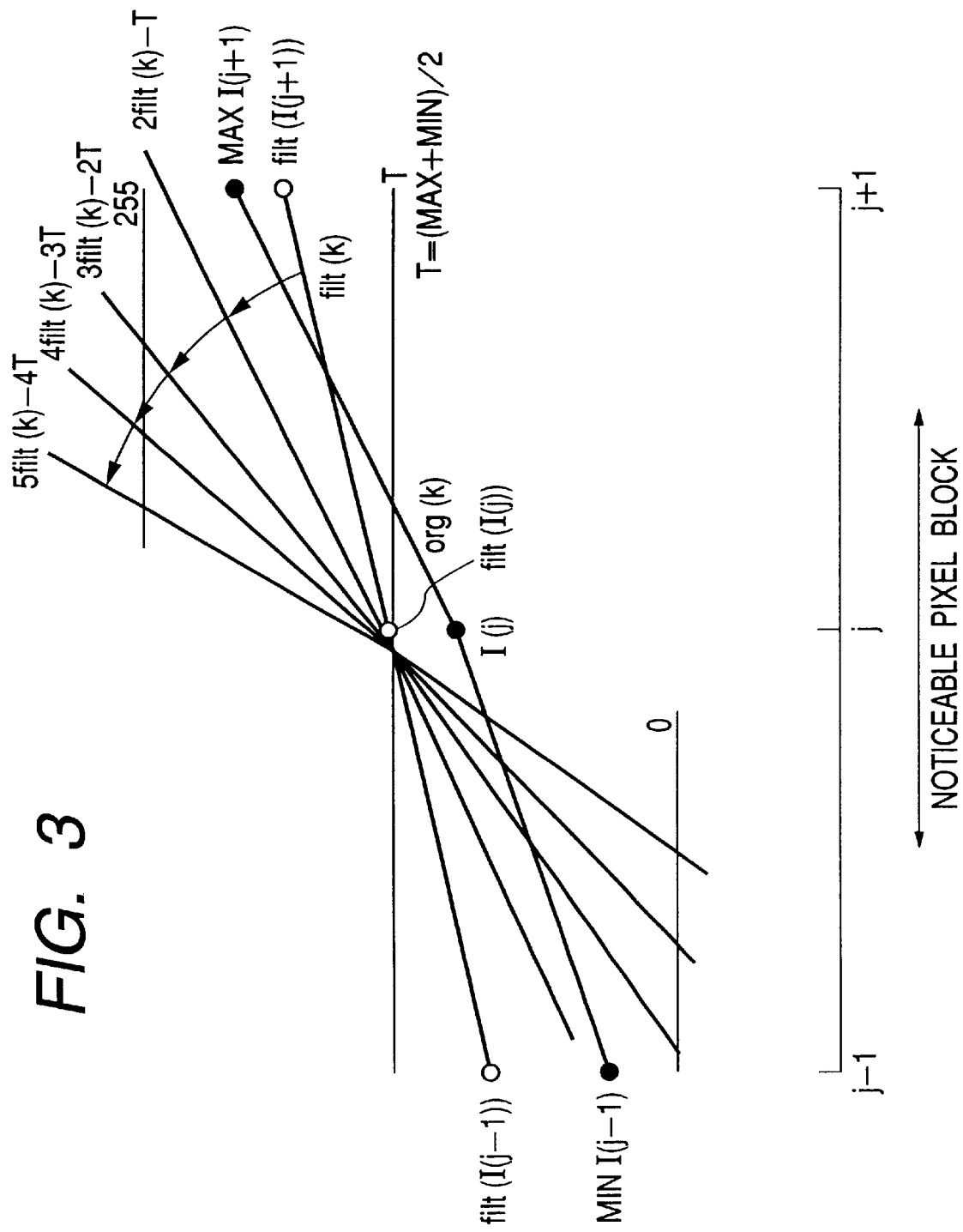
FIG. 3 is a structural view for explaining a high-resolution edge.

FIG. 3 is a view for simply explaining an interpolation calculation according to the present embodiment in one-dimensional field. In FIG. 3, a lateral axis direction denotes one-dimensional coordinate space, wherein the noticeable pixel is defined as j and the front and rear peripheral pixels are defined as (j−1) and (j+1) respectively. The noticeable pixel j and the plural pixels expanded from the pixel j collectively constitute a noticeable pixel block, and the information is generated based on this block. That is, a pixel value corresponding to the noticeable pixel block is generated from one noticeable pixel. A longitudinal axis direction indicates a depth direction of the pixel value, and points indicated by small black circles (referred as black points hereinafter) represent pixel values of original information of the noticeable pixel and the peripheral pixels. These black points and respectively defined as values I(j), I(j−1) and I(j+1).

It is assumed that an edge portion is formed by the peripheral pixels and the noticeable pixel is being inside the edge portion. A line drawn between the pixel values of the original information of the noticeable pixels and the peripheral pixels based on the linear interpolation process is defined as a line org(k) (k is coordinate value based on spatial interpolation point). In the drawing, in order to simplify the explanation, the line is drawn in analog manner. In order to form a high-resolution edge without any jag when the high-resolution information is generated, it is inappropriate to depend on the inputted original information. That is, at the edge portion to be formed, it is inappropriate to depend on an observation point indicated by the black point and the line org(k) formed in the linear interpolation process. Therefore, the original information is smoothed by the LPF. Points indicated by small white circles (referred as white points hereinafter) represent pixel values of the pixel obtained by smoothing the noticeable pixel and the peripheral pixel. The three white points are respectively defined as values filt(I(j)), filt(I(j−1)) and filt(I(j+1)).

A line drawn between the smoothed white points in the linear interpolation is defined as a line filt(k). The high-resolution edge is formed based on the line filt(k). The line filt(k) becomes a locus of density change in which a contrast is decreased in the depth direction as compared with that of the line org(k). A straight line T represents a mean value of a maximum value (MAX) and a minimum value (MIN) of the peripheral pixels. That is, a following equation is given.

$$T = (MAX + MIN)/2 \qquad (1)$$

In the present embodiment, formation of a new high-resolution edge is realized by a sequential locus by deforming a density change line represented by the value filt(k). As described above, the density change line represented by the line filt(k) becomes such a line as the contrast is more decreased as compared with that of the line org(k). Therefore, the line is deformed to have sharp inclination around the edge portion. A deformation degree of the density change line is calculated based on extrapolation to be executed to the density change line represented by the line filt(k) and the straight line T.

That is, if a change line used for sharply converting the inclination is defined as h(k), a following equation is given.

$$h(k) = a \times filt(k) - (a-1) \times T \qquad (2)$$

According to the equations (1) and (2), a following equation is given.

$$h(k) = a \times filt(k) - (a-1) \times (MAX+MIN)/2 \qquad (3)$$

If the equation (3) is rewritten, a following equation is given.

$$h(k) = a \times filt(k) + (-(a-1)/2) MAX + (-(a-1)/2) MIN \qquad (4)$$

Generally, the inclination of edge can be sharped by a following equation.

$$h(k) = a \times \text{filt}(k) + b \times \text{MAX} + c \times \text{MIN} \quad (5)$$

FIG. 3 shows the density change line in four cases of h(k) (a=2, 3, 4 and 5). In every case, the inclination of the line filt(k) becomes sharp around an intersection point of the filt(k) and the straight line T. In other words, a spatial coordinate position at the center of the edge is obtained by changing the line filt(k) by an angle of the fixed density change.

Figure 4:
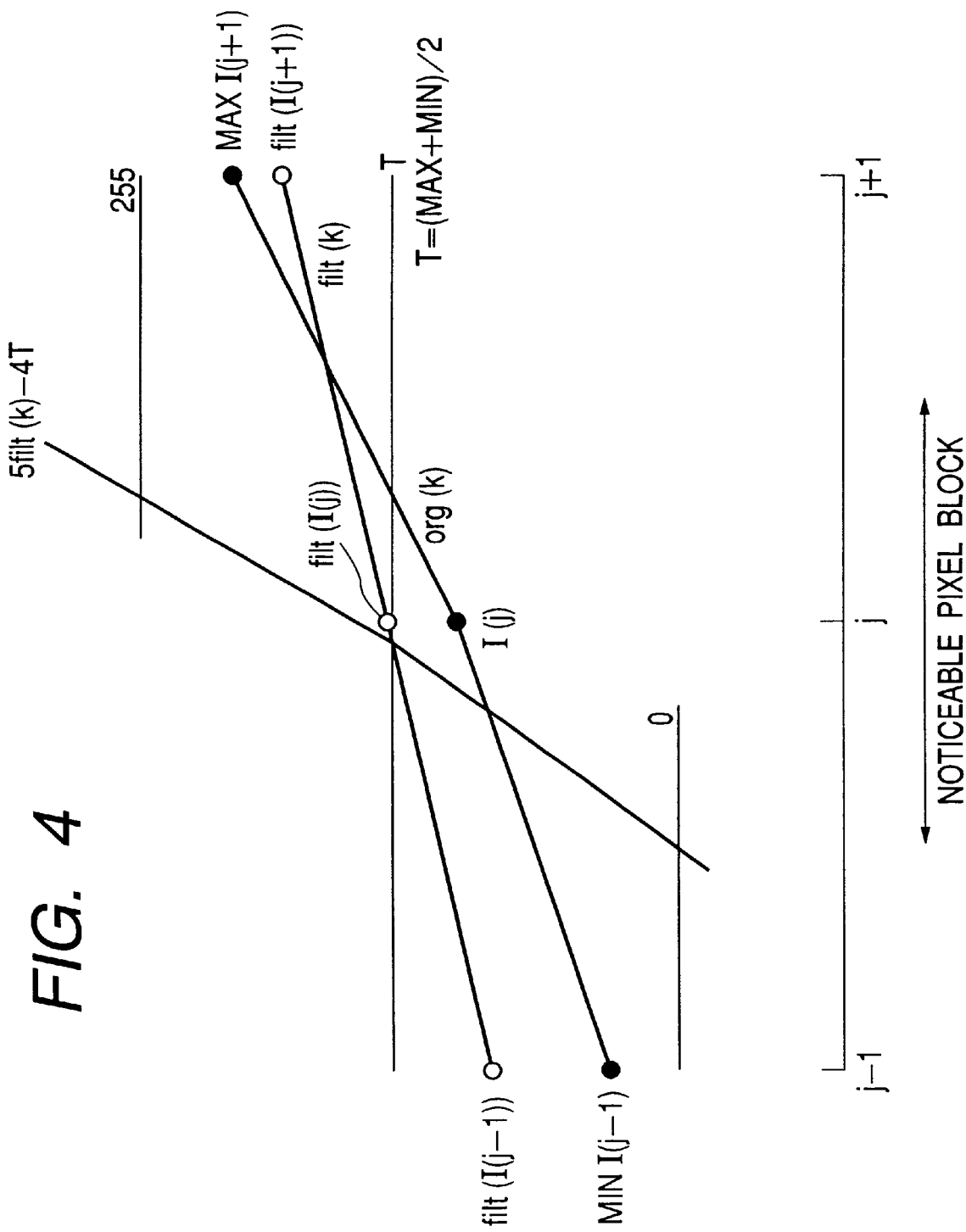
FIG. 4 is a structural view for explaining the high-resolution edge.

FIG. 4 shows a state to form the edge in case of a=5. Naturally, since the change line represented by h(k) increases the contrast, it is necessary to exert limitation according to the magnification of the density value. A critical point of the limitation corresponds to a dynamic range of a signal. That is, in the present embodiment, the critical point is selectable within a range from "0" to "$2^z-1$". Here, it is assumed that Z is "8", i.e., an input signal has information of 8 bits/pixel for one color, the dynamic range is selectable within the range from "0" to "255".

The present embodiment is different from Japanese Patent Application Laid-Open No. 9-252400 which is the prior application of the same applicant as that in the present application, in the point that the high-resolution information in which the edge contrast is more increased is generated. In FIG. 4, the MAX and MIN values are not used, but "0" and "255" respectively being maximum and minimum values capable of being taken by the input signal are used to calculate following equations.

$$h1(k) = (d \times 255 + (1-d) \times \text{filt}(k)) \quad (6)$$

$$h2(k) = (e \times 0 + (1-e) \times \text{filt}(k)) \quad (7)$$

Each of the equations (6) and (7) represents a sum of products of the fixed signal value and the interpolation value.

Figure 5:
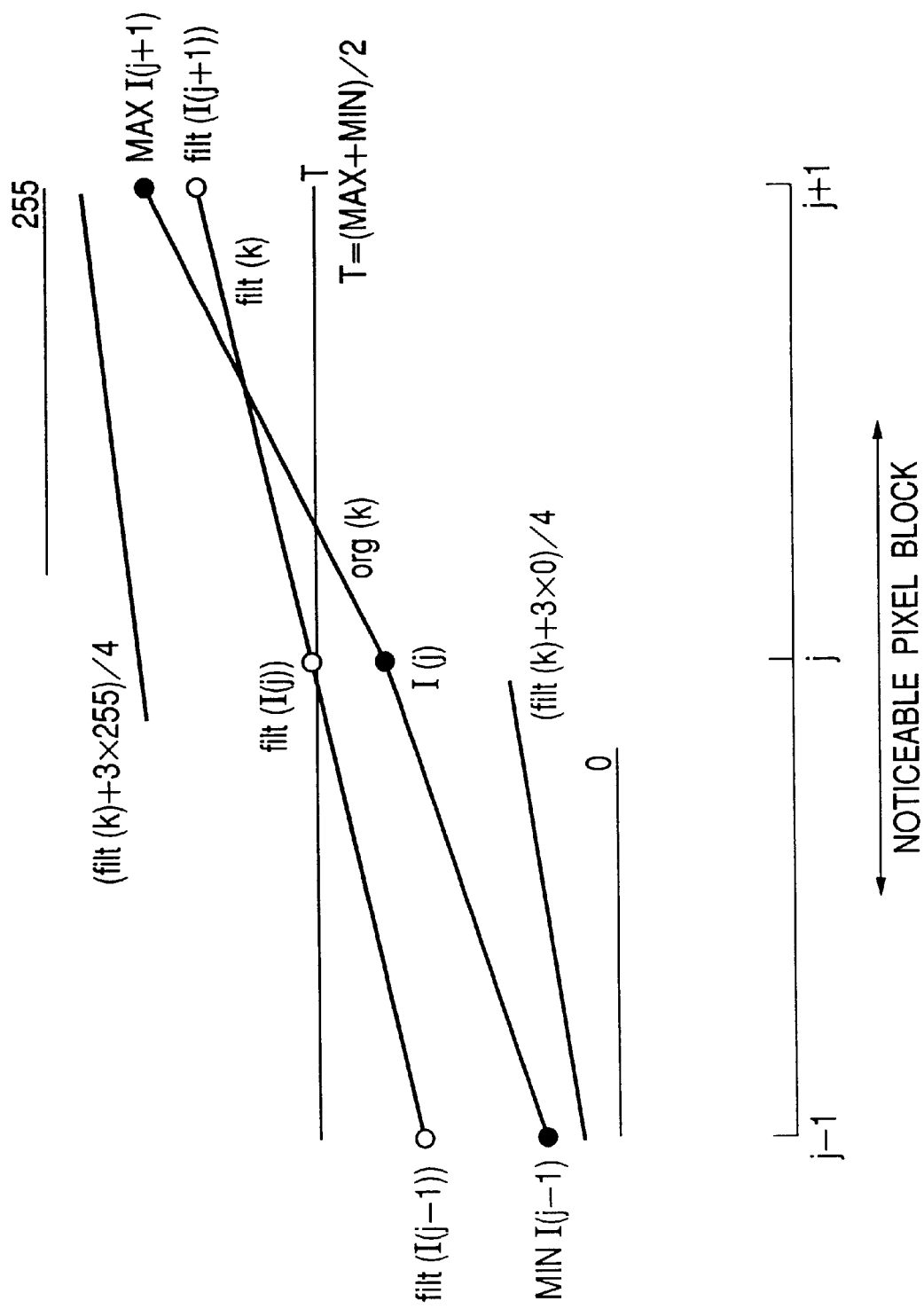
FIG. 5 is a structural view for explaining the high-resolution edge.

A locus of the density change line in case of d="¾" is shown in FIG. 5.

An output value D(k) is selected according to the three kinds of change lines obtained by the equations (5), (6) and (7), as follows.

$$D(k) = h1(k) \text{ (when } h(k) \geq h1(k))$$

$$D(k) = h(k) \text{ (when } h1(k) > h(k) \geq h2(k))$$

$$D(k) = h2(k) \text{ (when } h2(k) > h(k)) \quad (8)$$

Figure 6:
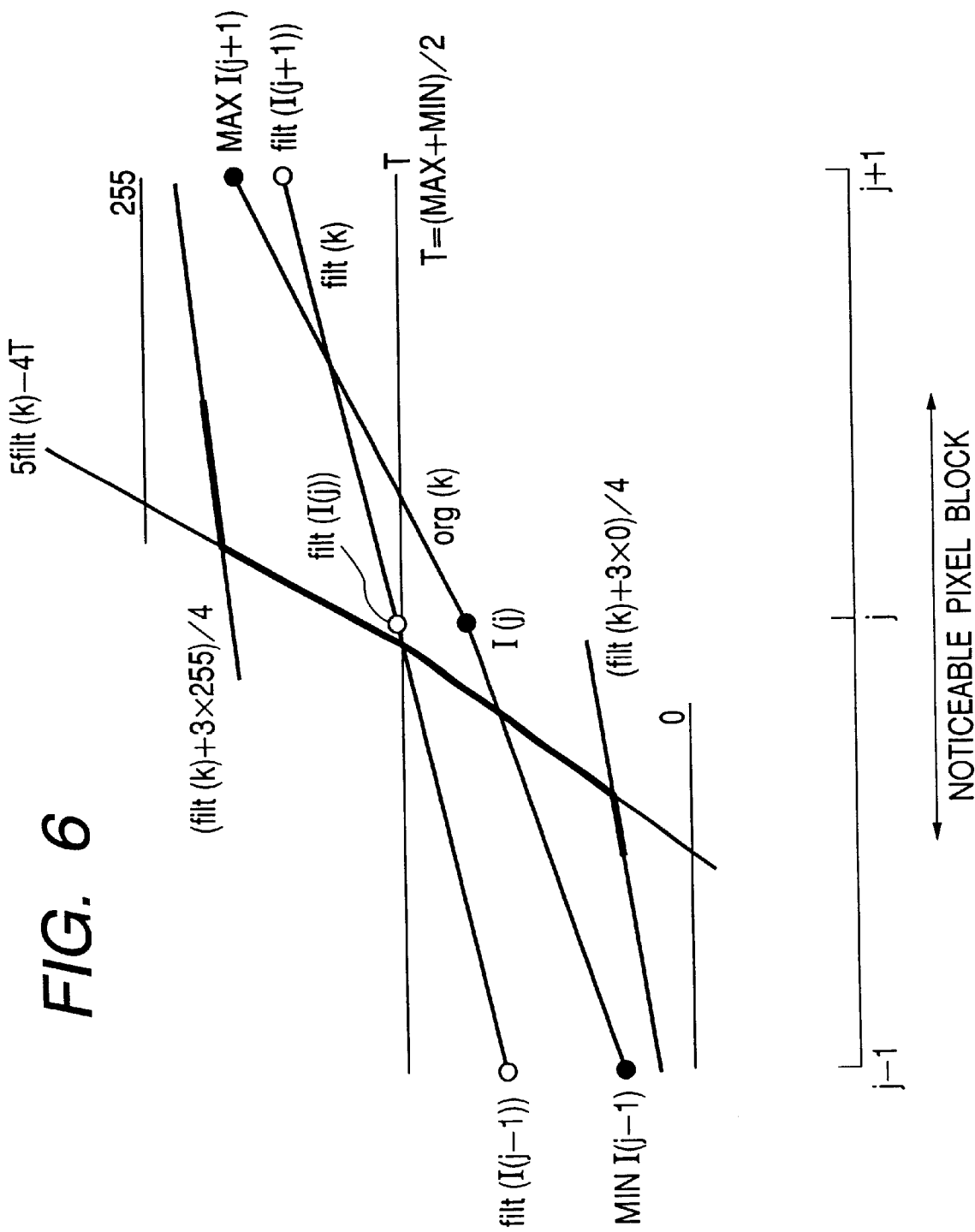
FIG. 6 is a structural view for explaining the high-resolution edge.

The above state is shown in FIG. 6. A portion of thick solid line corresponds to the high-resolution information D(k) formed based on the noticeable pixels block. As apparent from the thick solid line in FIG. 6, the locus of the density change line more increasing the contrast can be formed even at the maximum and minimum value portions of which contrasts have been reduced. Moreover, the inclination can be changed sharply at the high-resolution edge portion and changed gently at the portion spatially separated from the edge center. Even if the angle is gentle, since the line has inclination, the significantly smoother image can be formed as compared with the case of clipping the contrast at a fixed value. Moreover, the changes of these inclinations can be realized with continuity. That is, when the above three kinds of density change lines are designed to be optimal for a system which executes the above process, the locus of high-resolution edge can be freely formed.

Figure 7:
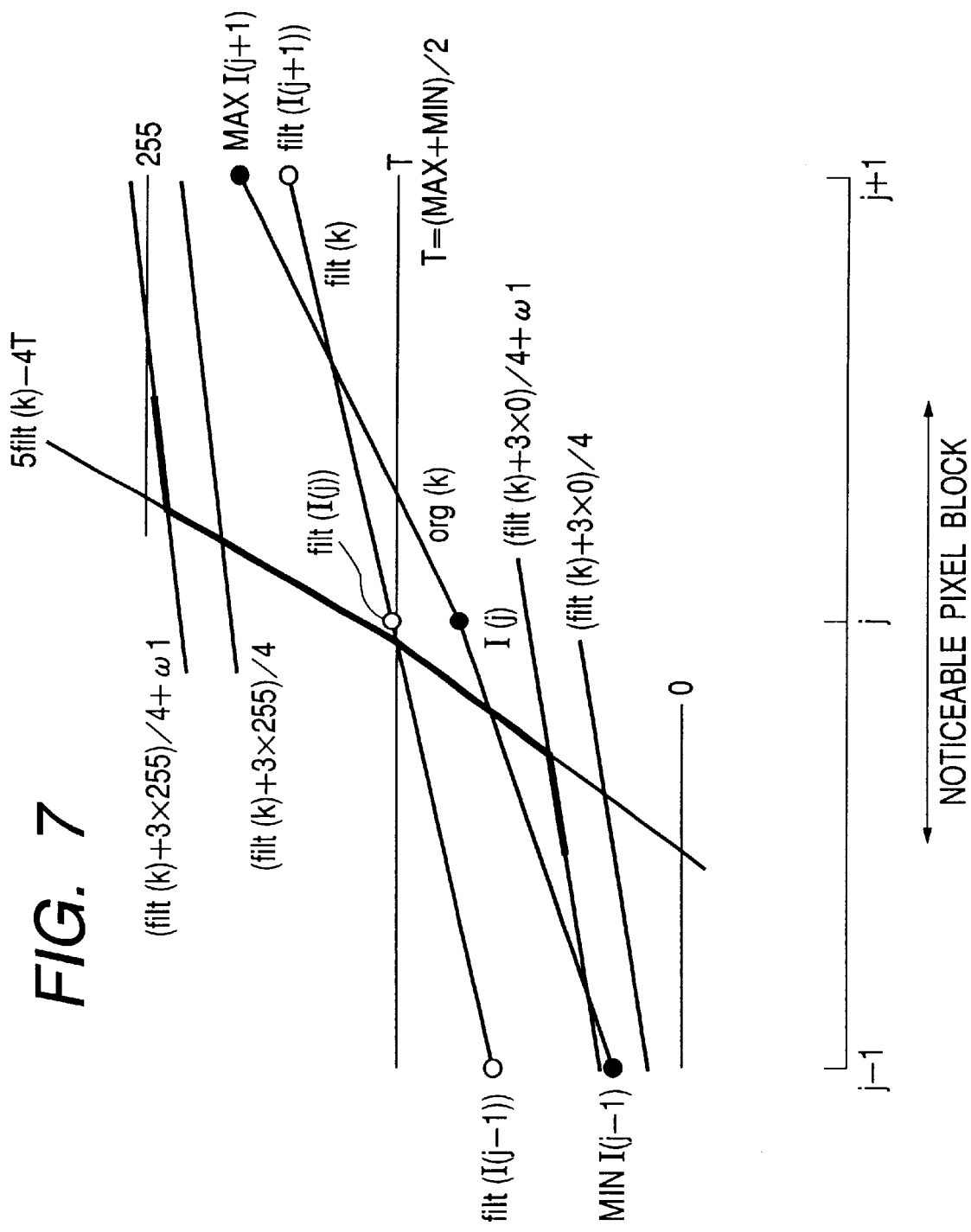
FIG. 7 is a structural view for explaining the high-resolution edge.

FIG. 7 indicates a state that an offset value ω1 is added to the equations (6) and (7). That is, in order to obtain a more legible image such as a character or the like, the density of the character can be changed by changing not only an edge angle but also a point at which the density change line is non-linearly changed.

Figure 8:
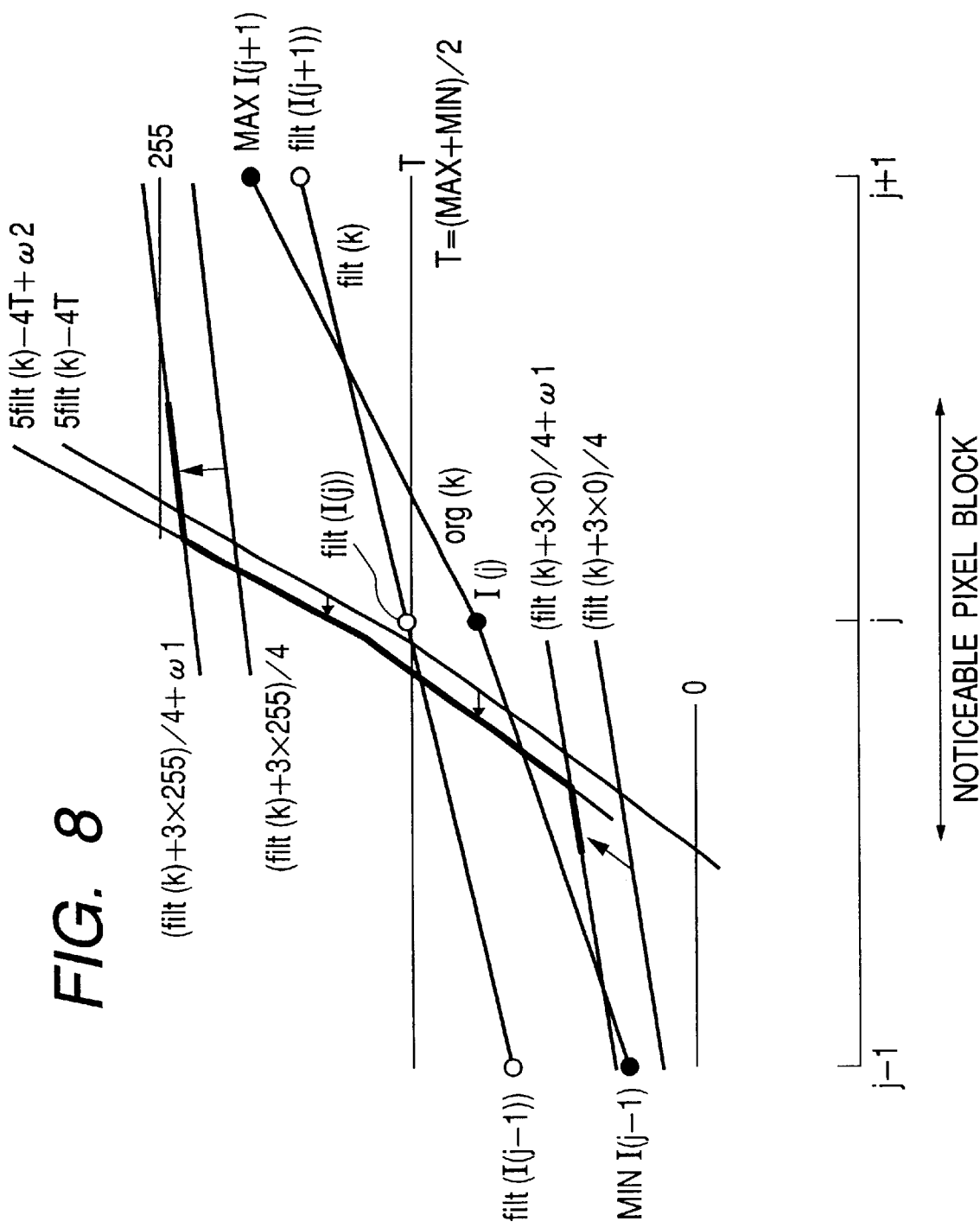
FIG. 8 is a structural view for explaining the high-resolution edge.

FIG. 8 indicates a state that the offset value ω1 is added to the equations (6) and (7) and an offset value ω2 is added to the equation (5). Since the edge central position tends to be shifted in the image such as the character or the like, it is possible in this image to control thickening and thinning of the character. When the density value exceeds the dynamic range of the signal upon adding the offset value, such the value is of course clipped.

Also, the equations (6) and (7) may be provided as the sum of products of the line org(k) and the fixed value instead of the sum of products of the line filt(k) and the fixed value. Since the line filt(k) is the density change line from which resolution dependency of the inputted original information has been eliminated, the line filt(k) is very important to form the edge central position. However, the edge central position is formed based on the equation (5), and the lines represented by the equations (6) and (7) are spatially separated from the edge center. Therefore, it is very effective to use also the line org(k) of which the contrast is higher than that of the line filt(k).

In the present embodiment, there is no problem even in case of MAX="255" or MIN="0". On the contrary, in a case where MAX and MIN exist within an intermediate level, the contrast of the edge is unnecessarily increased. For this reason, as a condition to execute this process, such a condition as the contrast of MAX−MIN is higher than or equal to a certain set threshold, or MAX is higher than or equal to a certain set value and MIN is lower than or equal to this value is required. It is effective to adopt such a specification as executing the process only when the inputted noticeable pixel is judged as an artificial image such as a character portion or the like by adding a judgement condition to judge if the inputted noticeable pixel is a character portion or a part of natural image.

As above, the density change line based on the sum of products of the interpolation value and the peripheral pixels and the locus according to the switching of the density change line based on the sum of products of the interpolation value and the fixed value have been explained. Subsequently, an example to calculate the density change line based on the sum of products of the interpolation value, the peripheral pixels and the fixed value will be described.

Figure 9:
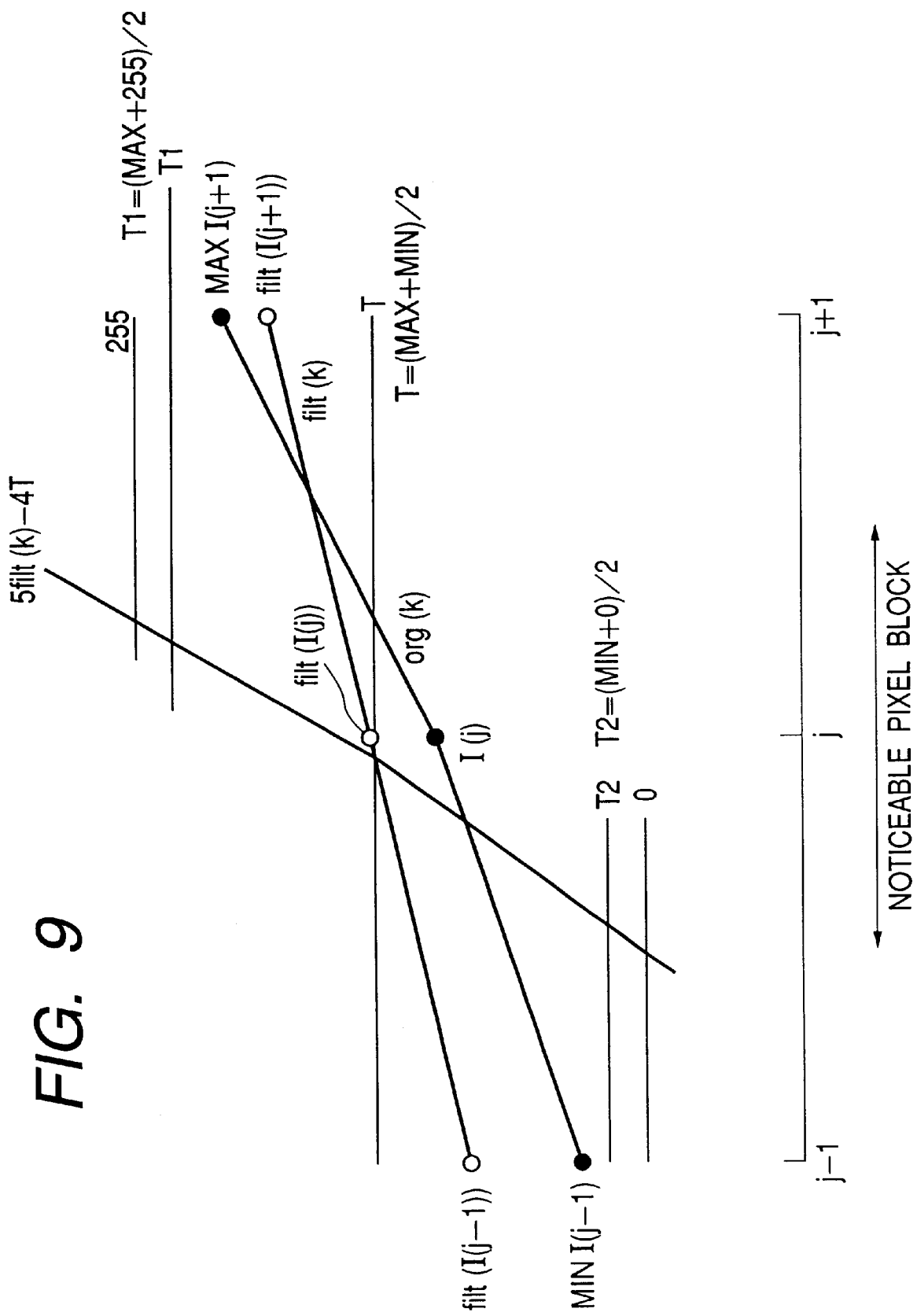
FIG. 9 is a structural view for explaining the high-resolution edge.

In FIG. 9, T1 indicates a mean value of MAX and "255", and T2 indicates a mean value of MIN and "0".

$$T1 = (\text{MAX} + 255)/2 \quad (9)$$

$$T2 = (\text{MIN} + 0)/2 \quad (10)$$

Figure 10:
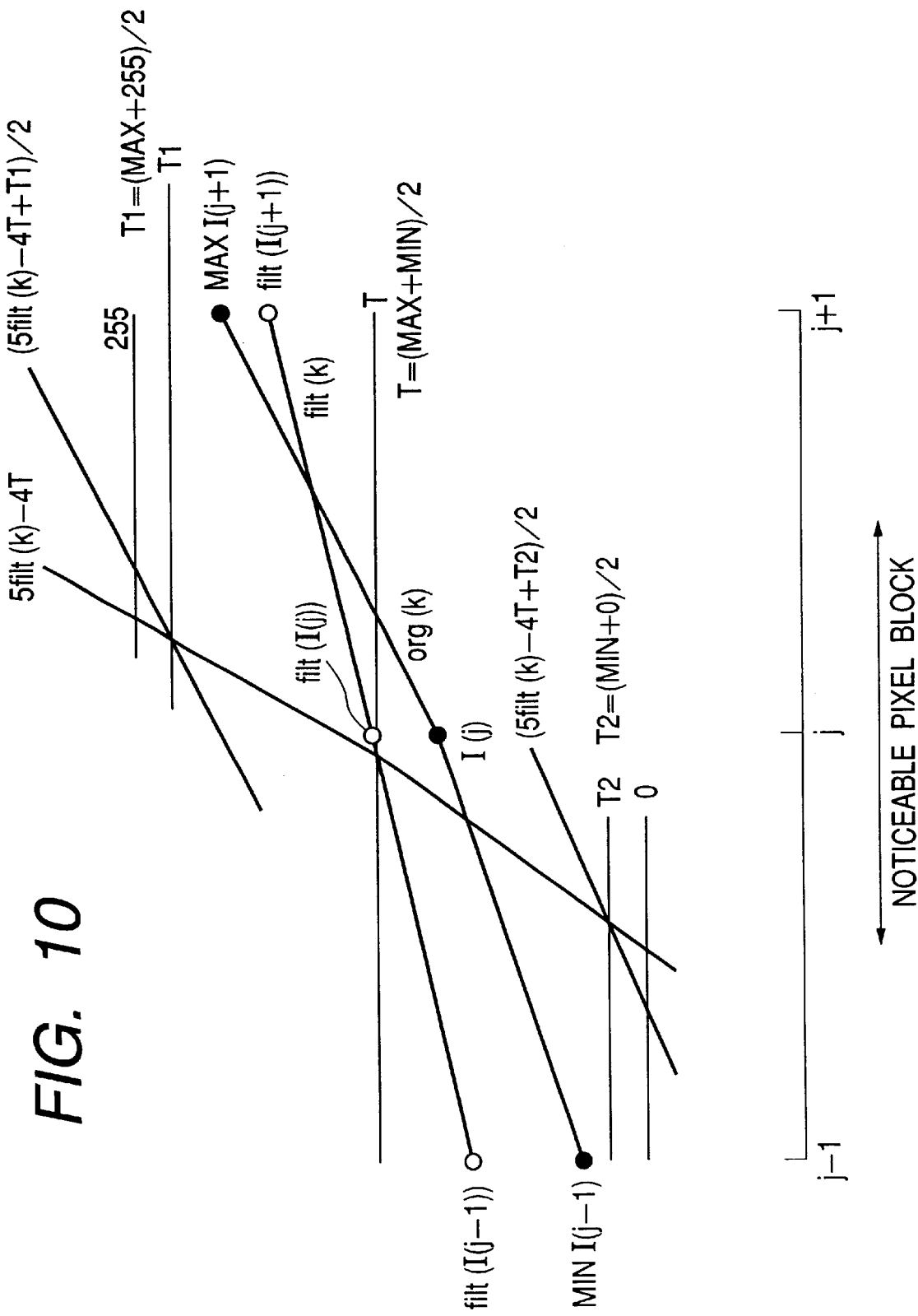
FIG. 10 is a structural view for explaining the high-resolution edge.

The interpolation with each straight line represented by the mean values T1 and T2 and the line h(k) obtained by the equation (5) is calculated. As shown in FIG. 10, if it is assumed that h(k)=5filt(k)−4T and that each coefficient concerning the interpolation of the values T1 and T2 and the line h(k) is ½, following equations are given.

$$h3(k) = (5\text{filt}(k) - 4T + T1)/2 \quad (11)$$

$$h4(k) = (5\text{filt}(k) - 4T + T1)/2 \quad (12)$$

If the equations (11) and (12) are rearranged by using the equations (1), (9) and (10), following equations are given.

$$h3(k) = (-\tfrac{3}{4}) \times \text{MAX} - \text{MIN} + (\tfrac{5}{2}) \times \text{filt}(k) + (\tfrac{1}{4}) \times 255 \quad (13)$$

$$h4(k) = (-\tfrac{3}{4}) \times \text{MAX} - \text{MIN} + (\tfrac{5}{2}) \times \text{filt}(k) + (\tfrac{1}{4}) \times 0 \quad (14)$$

Subsequently, the output value D(k) is selected depending on the three kinds of change lines obtained by the equations (5), (13) and (14), as follows.

$$D(k)=h3(k) \text{ (when } h(k) \geq h3(k))$$

$$D(k)=h(k) \text{ (when } h3(k)>h(k)h4(k))$$

$$D(k)=h4(k) \text{ (when } h4(k)>h(k)) \tag{15}$$

Figure 11:
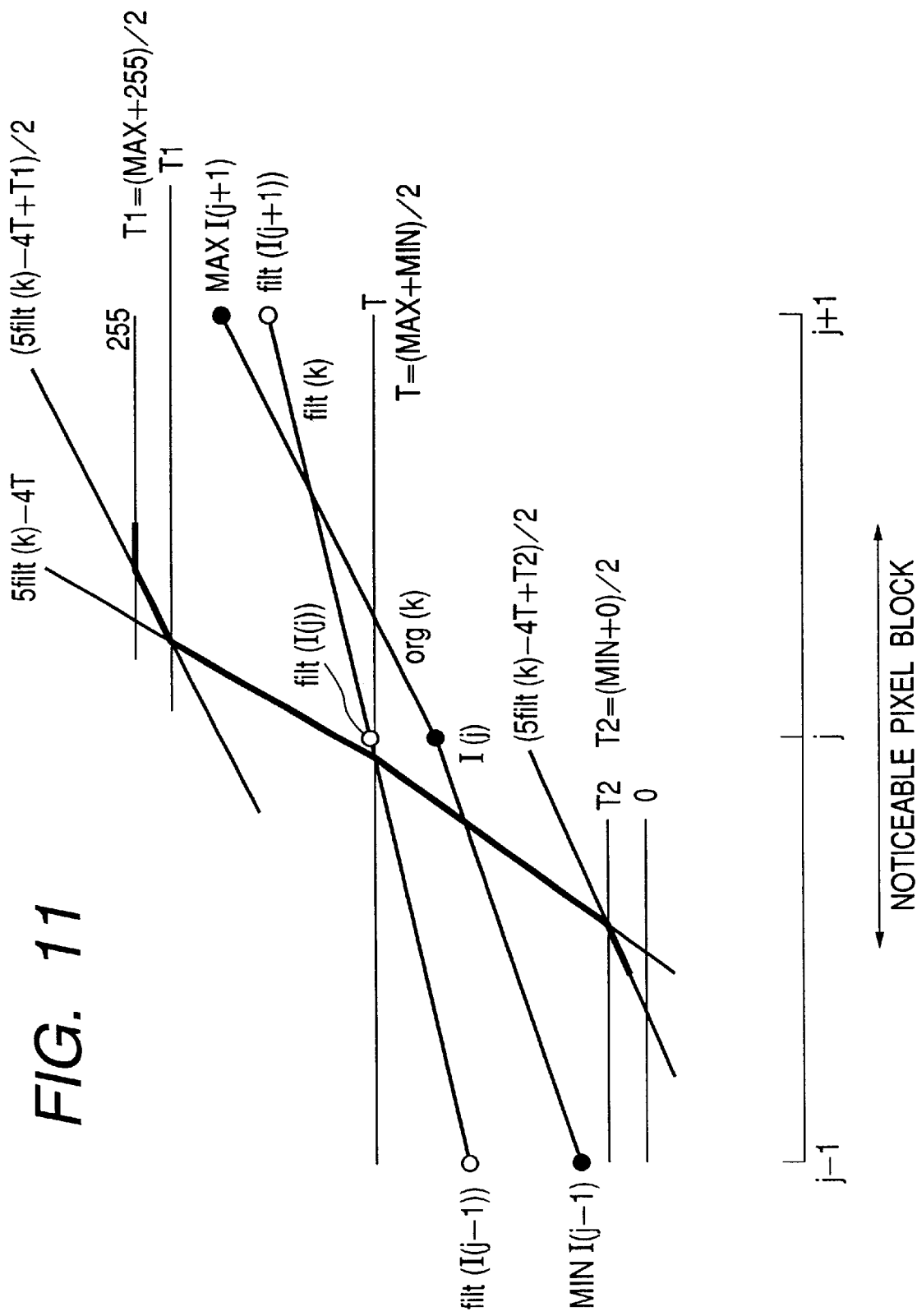
FIG. 11 is a structural view for explaining the high-resolution edge.

The above state is shown in FIG. 11. A portion of thick line corresponds to the high-resolution information D(k) formed based on the noticeable pixel block. Of course, the change lines exceeding the values "255" and "0" are clipped.

An advantage of this change line is to make angle controlling easy. That is, as apparent from the mean values T1 and T2 shown in FIG. 11, the density at which the inclination of the change line is changed can be previously set. In the equations (9) and (10), although the examples that T1 is the means value of MAX and "255" and T2 is the mean value of MIN and "0" are given, of course, values other than these values can be freely set. As mentioned above, the object of the present invention is to change the inclination sharply at the edge portion and gently at the portion spatially separated from the edge center. In this case, if the density to gently changing the inclination can be previously set, a degree of freedom in image designing can be widened. Of course, it is possible to set a larger number of densities for change than the two kinds of values T1 and T2.

In this case, the inclination can be gradually changed from sharp one to gentle one. The gentle inclination can be realized by gradually changing a coefficient in interpolating the change line h(k). That is, if the line which is calculated by the interpolation and extrapolation of the line org(k) or the line filt(k) being the interpolation value and the function (i.e., peripheral pixel value or fixed value) not depending on the interpolation address k is managed as the locus of the density line, the edge angle can be easily and freely changed from sharp one to gentle one as maintaining continuity.

As above, it has been explained the case where the one-dimensional and high-resolution edge is formed. However, the above situation can be of course expanded to a two-dimensional field. Further, a window for detecting MAX and MIN, a window for performing the filtering and a window used in the interpolation may have the same size or the different sizes. Of course, the process may be executed in such a manner as decreasing the times of the sum of products by gathering the interpolation calculation and the filtering calculation together. Also, an interpolation method other than the linear interpolation process may be used.

Although the smoothing has been mainly explained as the filtering process, there is some fear that important information is deleted by executing the smoothing. In such a case, it is possible to initially use a different filter. Also, it is possible to evaluate a characteristic amount of the image and dynamically change the filter based on this evaluation.

As to the detection process for detecting the pixel value from the peripheral pixels, an example to execute the process by extracting the two kinds of values MAX and MIN has been explained. However, of course, the pixel values are not limited to them. Namely, pixels having other value such as an intermediate value within the window or the like may be used. Further, the number of pixels to be extracted is not limited to two. For example, MAX and MIN are detected within each of two kinds of windows of which sizes are made different from each other. As a result, it is also possible to form the density change line in accordance with a function using the total four kinds of values detected.

As the fixed value used in the sum of products, the two kinds of values "0" and "$2^z-1$" being the maximum and minimum values within the dynamic range of the input signal have been used. However, the values are not limited to them, and two or more kinds of fixed values may be used. That is, if each pixel value of the peripheral pixels to be extracted is defined as P(n) and the fixed value to be used in the calculation is defined as Q(s), a following equation is given.

$$h(k)=a \times filt(k)+b1 \times P(1)+b2 \times P(2)+b3 \times P(3)+b4 \times P(4)+ \ldots +c1 \times Q(1)+c2 \times Q(2)+c3 \times Q(3)+c4 \times Q(4)+ \ldots \tag{16}$$

Generally, the m peripheral pixels are extracted and the t kinds of fixed values are used, a following equation is given.

$$h(k) = a \times filt(k) + \sum_{n=1}^{m} \alpha(n)P(n) + \sum_{s=1}^{t} \gamma(s)Q(s) \tag{17}$$

Even in this case, there are plural combinations of a, $\alpha(n)$, P(n), $\gamma(s)$ and Q(s), and the output value D(k) can be selected from the calculated the plural lines h(k).

As described above, in a case where the filtering is not limited to the smoothing, the interpolation value at the interpolation point k is described as C(k), and if the arbitrary offset value $\omega$ is added, the equation (17) is generally described as follows.

$$h(k) = \sum_{n=1}^{m} \alpha(n)P(n) + \beta C(k) + \sum_{s=1}^{t} \gamma(s)Q(s) + \omega \tag{18}$$

($\alpha(n)$, $\beta(\beta \neq 0)$ and $\gamma(s)$ are arbitrary coefficients, Q(s) is signal value within range capable of being taken by pixel value, $\omega$ is arbitrary value, m satisfies m≧1, and t satisfies t≧1)

$$\sum_{n=1}^{m} \alpha(n) + \beta + \sum_{s=1}^{t} \gamma(s) = 1 \tag{19}$$

The h(k) satisfying the equations (18) and (19) is represented by the addition of a function depending on the interpolation point and a function not depending on the interpolation point. The functions not depending on the interpolation point can be classified into the function depending on the peripheral pixels and the function depending on the fixed value not concerning the peripheral pixels.

Figure 12:
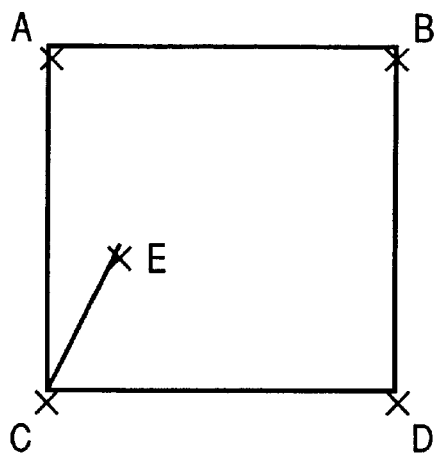
FIG. 12 is a structural view showing a conventional closest interpolation method.
Figure 13:
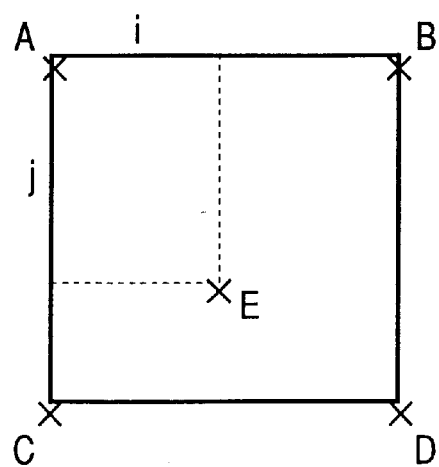
FIG. 13 is a structural view showing a conventional common primary interpolation method.

In the conventional example shown in FIG. 12, the function does not depend on the interpolation point because neighboring observation points are replaced. That is, in case of replacing the closest observation point, the pixel values within the noticeable pixel block around the observation point being the noticeable point have a fixed value irrespective of the interpolation point. Further, in FIG. 13, the function depends on the interpolation point. Also, the function depends on the interpolation point in a conventional high-order interpolation calculation. However, in order to form the high-resolution information, if some information formation such as speculation of the edge portion, a change of the contrast inclination or the like is not performed, the image conversion can not be performed in high image quality.

The concept of the present invention can be found in changing the high-resolution information which does not exist in the original information. As described above, by the change line which satisfies the equations (18) and (19), it is possible to realize the satisfactory conversion in which the change of edge position, the change of contrast inclination and the like can be freely set. Further, since the above equations contain the terms of function based on the fixed value not relative to the peripheral pixel, controlling is possible to arbitrarily change the density and vary the line width. Therefore, even if the original image has been deteriorated, further satisfactory image quality can be obtained.

As described above, according to the present invention, in the case where the inputted low-resolution information is converted into the high-resolution information, it is possible to realize the conversion which does not depend on the low resolution of the original information and can produce the jagless image of which image quality is high.

In the case where the image formation apparatus to which the present invention has been applied is connected to the internet television, the computer and the like, if screen copy for copying the information on the screen is performed, if the character contained in the image as the part thereof should be excellently outputted, and even if the contrast of the input information has been deteriorated due to the MTF of the image pickup system of the facsimile apparatus or the like mainly managing the character, the drawing and the like, it is possible to form the image having higher resolution than the contrast of the input information. Furthermore, in the present invention, since the new edge angle and the edge central position can be freely designed, it is possible to form the satisfactory edge having continuity.

Therefore, according to the present invention, since the clear jagless image can be outputted to the user who reads this image, it is possible to provide products such as a printer, a video printer and the like to which a high-quality output image can be expected even based on an original image of which information quantity is low.

In the present invention, in addition to the image formation apparatus which is integrally or separately provided as an image output terminal of an information process equipment such as a computer or the like, a copy machine combined with a reader or the like and a facsimile apparatus having a transmission/reception function may be used.

Also, the present invention may be applied to a system structured by plural devices such as a host computer, an interface equipment, a reader, a printer and the like. Further, the present invention may be applied to an individual unit such as a copy machine, a facsimile apparatus or the like.

Also, the present invention may be applied to a case where a storage medium recording therein software program codes to realize the functions of the above embodiment is supplied to a system or an apparatus, and a computer (CPU or MPU) of this system or apparatus reads the program codes stored in the medium to execute them.

In this case, the program codes themselves read from the storage medium realize the functions of the above embodiment, and the storage medium storing therein the program codes constitutes the present invention. As the storage medium for supplying the program codes, e.g., a floppy disk, a hard disk, an optical disk, a magneto-optical disk, a CD-ROM, a CD-R, a magnetic tape, a non-volatile memory card, a ROM or the like can be used.

It is apparently understood that the present invention incorporates not only a case where the functions of the above embodiment are realized by executing the program codes read by the computer, but also a case where an OS (operating system) operating on the computer performs a part or all of the actual process based on instructions of the program codes, and thus the functions of the above embodiment are realized by such the process.

Further, it is apparently understood that the present invention also incorporates a case where the program codes read from the storage medium are stored into a memory provided for a function expansion board of a computer or a function expansion unit connected to a computer and, after that, a CPU or the like provided for the function expansion board or function expansion unit executes a part or all of the actual process based on instructions of the program codes, and the functions of the above embodiment are realized by the process.

As many apparently widely different embodiments of the present invention can be made without departing from the spirit and scope thereof, it is to be understood that the invention is not limited to the specific embodiments thereof expect as defined in the appended claims.

What is claimed is:

1. An image process apparatus for converting low-resolution information to high-resolution information, comprising:

input means for inputting the low-resolution information;

detection means for detecting information of m ($m \geq 1$) pixels from the low-resolution information of a noticeable pixel inputted by said input means and its plural peripheral pixels;

conversion means for converting the low-resolution information of the noticeable pixel inputted by said input means, into interpolation information of plural pixels; and calculation means for calculating the high-resolution information on the basis of an arbitrary value not concerning the information of the m pixels detected by said detection means, the interpolation information converted by said conversion means, and the inputted low-resolution information.

2. An apparatus according to claim 1, further comprising smoothing means for smoothing the inputted low-resolution information, and wherein said conversion means converts the information of the noticeable pixel into the interpolation information of the plural pixels based on the information smoothed by said smoothing means.

3. An apparatus according to claim 1, wherein the value m is "2", and said detection means detects maximum and minimum values from the low-resolution information of the inputted noticeable pixel and the plural peripheral pixels.

4. An image processing method for converting low-resolution information into high-resolution information, comprising the steps of:

detecting information of m ($m \geq 1$) pixels from the low-resolution information of an inputted noticeable pixel and its plural peripheral pixels;

converting the low-resolution information of the inputted noticeable pixel into interpolation information of plural pixels; and calculating the high-resolution information based on an arbitrary value not concerning the information of the detected m pixels, the interpolation information obtained by said conversion step, and the inputted low-resolution information.

5. A method according to claim 4, wherein the inputted low-resolution information is smoothed, and said conversion step converts the information of the noticeable pixel into the interpolation information of the plural pixels based on the smoothed information.

6. A method according to claim 4, the value m is "2", and said detection step detects maximum and minimum values from the low-resolution information of the inputted noticeable pixel and the plural peripheral pixels.

7. An image process apparatus comprising:

detection means for detecting m (m≧1) pixels from peripheral pixels of a noticeable pixel in input image information (a pixel value at an observation point among m points is defined as P(n));

interpolation means for interpolating the noticeable pixel to plural pixels based on the input image information; and calculation means for calculating an output value h(k) based on an interpolation value C(k) interpolated at each interpolation point k, according to a following equation, $$h(k) = \sum_{n=1}^{m} \alpha(n)P(n) + \beta C(k) + \sum_{s=1}^{t} \gamma(s)Q(s) + \omega$$

($\alpha(n)$, $\beta(\beta \neq 0)$ and $\gamma(s)$ are arbitrary coefficients, Q(s) is an arbitrary signal value within a range capable of being taken by a pixel value, $\omega$ is an arbitrary value, and t satisfies t≧1).

8. An apparatus according to claim 7, further comprising smoothing means for smoothing the input image information, and wherein said interpolation means interpolates the noticeable pixel to the plural pixels based on the smoothed information.

9. An apparatus according to claim 7, wherein a relation of $\alpha(n)$, $\beta$ and $\gamma(s)$ satisfies $$\sum_{n=1}^{m} \alpha(n) + \beta + \sum_{s=1}^{t} \gamma(s) = 1.$$

10. An apparatus according to claim 7, wherein there are plural combinations of $\alpha(n)$, P(n), $\beta$, $\gamma(s)$ and Q(s), and the most suitable value is selected as an output value D(k) by comparing values of the plural calculated h(k) with others.

11. An apparatus according to claim 7, wherein $\alpha(1)$ and $\alpha(2)$ are respectively maximum and minimum values within the peripheral pixels when m satisfies m=2.

12. An apparatus according to claim 7, wherein, when the input image information corresponds to Z bits/pixel for one color and t satisfies t=2, $\gamma(1)$ and $\gamma(2)$ are respectively "0" and "$2^z-1$".

13. An image processing method comprising:

a detection step of detecting m (m≧1) pixels from peripheral pixels of a noticeable pixel in input image information (a pixel value at an observation point among m points is defined as P(n));

an interpolation step of interpolating the noticeable pixel to plural pixels based on the input image information; and a calculation step of calculating an output value h(k) based on an interpolation value C(k) interpolated at each interpolation point k, according to an following equation, $$h(k) = \sum_{n=1}^{m} \alpha(n)P(n) + \beta C(k) + \sum_{s=1}^{t} \gamma(s)Q(s) + \omega$$

($\alpha(n)$, $\beta(\beta \neq 0)$ and $\gamma(s)$ are arbitrary coefficients, Q(s) is an arbitrary signal value within a range capable of being taken by a pixel value, $\omega$ is an arbitrary value, and t satisfies t≧1).

14. A computer-readable storage medium which stores a process program composed of:

a detection process for detecting m (m≧1) pixels from peripheral pixels of a noticeable pixel in input image information (a pixel value at an observation point among m points is defined as P(n));

an interpolation process for interpolating the noticeable pixel to plural pixels based on the input image information; and a calculation process for calculating an output value h(k) based on an interpolation value C(k) interpolated at each interpolation point k, according to an following equation, $$h(k) = \sum_{n=1}^{m} \alpha(n)P(n) + \beta C(k) + \sum_{s=1}^{t} \gamma(s)Q(s) + \omega$$

($\alpha(n)$, $\beta(\beta \neq 0)$ and $\gamma(s)$ are arbitrary coefficients, Q(s) is an arbitrary signal value within a range capable of being taken by a pixel value, $\omega$ is an arbitrary value, and t satisfies m≧1).

* * * * *

UNITED STATES PATENT AND TRADEMARK OFFICE
CERTIFICATE OF CORRECTION

PATENT NO.     : 6,400,413 B1
DATED          : June 4, 2002
INVENTOR(S)    : Miyake It is certified that error appears in the above-identified patent and that said Letters Patent is hereby corrected as shown below:

<u>Title page,</u>
Item [56], References Cited, FOREIGN PATENT DOCUMENTS,

"7093531       4/1995              -- 7-093531    4/1995
 7105359       4/1995                 7-105359    4/1995
 7107268       4/1995                 7-107268    4/1995
 9252400       9/1997" should read    9-252400    9/1997 --.

<u>Column 1,</u>
Line 20, "the" should read -- a --; and
Line 56, "number" should read -- numbers --.

<u>Column 2,</u>
Line 1, "can not" should read -- cannot --; and
Line 52, "indow" should read -- window --.

<u>Column 3,</u>
Line 38, "can not" should read -- cannot --.

<u>Column 7,</u>
Line 1, "sharped" should read -- sharpened --.

<u>Column 10,</u>
Line 63, "can not" should read -- cannot --.

<u>Column 12,</u>
Line 17, "expect" should read -- except --.

<u>Column 13,</u>
Line 1, "claim 4," should read -- claim 4, wherein --.

UNITED STATES PATENT AND TRADEMARK OFFICE
CERTIFICATE OF CORRECTION

PATENT NO. : 6,400,413 B1
DATED : June 4, 2002
INVENTOR(S) : Miyake

It is certified that error appears in the above-identified patent and that said Letters Patent is hereby corrected as shown below:

<u>Column 14,</u>
Lines 12 and 36, "an" should read -- a --.

Signed and Sealed this

Twenty-second Day of April, 2003

JAMES E. ROGAN
*Director of the United States Patent and Trademark Office*